(12) United States Patent
McKay et al.

(10) Patent No.: US 10,508,739 B2
(45) Date of Patent: Dec. 17, 2019

(54) MECHANICAL SEAL ASSEMBLY

(71) Applicant: EVENORT LTD, Sheffield (GB)

(72) Inventors: Craig McKay, Sheffield (GB);
Matthew Smith, Sheffield (GB);
Darren Roberts, Sheffield (GB)

(73) Assignee: EVENORT LTD, Sheffield (GB)

( * ) Notice: Subject to any disclaimer, the term of this patent is extended or adjusted under 35 U.S.C. 154(b) by 56 days.

(21) Appl. No.: 15/574,450

(22) PCT Filed: May 13, 2016

(86) PCT No.: PCT/GB2016/000100
§ 371 (c)(1),
(2) Date: Nov. 15, 2017

(87) PCT Pub. No.: WO2016/185158
PCT Pub. Date: Nov. 24, 2016

(65) Prior Publication Data
US 2018/0135755 A1 May 17, 2018

(30) Foreign Application Priority Data

May 15, 2015 (GB) .................................. 1508433.8

(51) Int. Cl.
*F16J 15/08* (2006.01)
*F16J 15/06* (2006.01)
*F16L 23/20* (2006.01)

(52) U.S. Cl.
CPC ......... *F16J 15/0887* (2013.01); *F16J 15/061* (2013.01); *F16L 23/20* (2013.01)

(58) Field of Classification Search
CPC ...... F16J 15/08; F16J 15/0881; F16J 15/0887; F16J 15/0893; F16J 15/02; F16J 15/062; F16J 15/064

(Continued)

(56) References Cited

U.S. PATENT DOCUMENTS 1,703,696 A * 2/1929 Stratford ............. F16L 19/0218
285/334.4
1,825,962 A * 10/1931 Laird ................... F16J 15/0887
220/378

(Continued)

FOREIGN PATENT DOCUMENTS

| FR | 828596 A | 5/1938 |
|---|---|---|
| FR | 911682 A | 7/1946 |

(Continued)

OTHER PUBLICATIONS

Combined Search and Examination Report issued in corresponding GB Application No. 1508433.8 dated Nov. 20, 2015 (8 pages).

(Continued)

*Primary Examiner* — Kristina R Fulton
*Assistant Examiner* — L. Susmitha Koneru
(74) *Attorney, Agent, or Firm* — Osha Liang LLP

(57) ABSTRACT

A mechanical seal assembly has a first flange (10) and a second flange (10). The body of each flange defines a recess adjacent a flange connection face and wherein said recess includes an annular metallic seal surface (28). A metallic seal element (32) is locatable between the first and second flanges. First and second faces of the metallic seal element include an annular seal surface (42). The seal element is configured to be clamped between the two flange bodies (10), to create a metal-to-metal seal between the respective annular seal surface (42) of the seal element and the metallic seal surface (28) of a respective flange body.

19 Claims, 6 Drawing Sheets

(58) Field of Classification Search
USPC .......... 277/607, 614; 285/343, 23, 298, 368, 285/351
See application file for complete search history.

(56) References Cited

U.S. PATENT DOCUMENTS

| | | | |
|---|---|---|---|
| 1,873,855 A * | 8/1932 | Wilson | F16L 23/20 220/327 |
| 2,291,709 A * | 8/1942 | Goetze | F16J 15/008 277/614 |
| 2,303,114 A | 11/1942 | Egger | |
| 3,141,685 A * | 7/1964 | Watts | F16L 17/063 277/320 |
| 3,217,922 A | 11/1965 | Glasgow | |
| 3,749,426 A | 7/1973 | Tillman, III | |
| 3,815,779 A * | 6/1974 | Ludwig | F16L 23/006 220/89.2 |
| 3,989,285 A | 11/1976 | Yancey | |
| 4,019,371 A * | 4/1977 | Chaplin | G01M 3/2861 73/46 |
| 4,095,809 A * | 6/1978 | Smith | F16J 15/061 277/609 |
| 4,303,251 A | 12/1981 | Harra et al. | |
| 4,494,762 A * | 1/1985 | Geipel | F16L 23/20 277/614 |
| 4,550,921 A | 11/1985 | Smith | |
| 5,135,266 A * | 8/1992 | Bridges | E21B 33/0422 285/123.12 |
| 5,829,794 A * | 11/1998 | Schulz-Hausmann | F16L 23/036 285/205 |
| 5,839,765 A * | 11/1998 | Carter | F16L 23/18 285/334.2 |
| 6,299,216 B1 * | 10/2001 | Thompson | F16L 23/167 277/318 |
| 6,409,176 B2 * | 6/2002 | Allen | E21B 33/035 277/336 |
| 6,722,426 B2 * | 4/2004 | Sweeney | E21B 33/02 166/115 |
| 7,624,991 B2 * | 12/2009 | Putch | F16L 17/06 277/606 |
| 2004/0056432 A1 * | 3/2004 | Walker | E21B 33/03 277/627 |
| 2011/0316239 A1 * | 12/2011 | Holliday | F16J 15/002 277/602 |

FOREIGN PATENT DOCUMENTS

| | | |
|---|---|---|
| GB | 1113477 A | 5/1968 |
| GB | 1212767 A | 11/1970 |
| WO | 2014100114 A1 | 6/2014 |

OTHER PUBLICATIONS

Examination Report issued in corresponding GB Application No. 1508433.8 dated Apr. 15, 2016 (3 pages).
Examination Report issued in corresponding GB Application No. 1508433.8 dated Jul. 7, 2017 (4 pages).
Notification of Grant issued in corresponding GB Application No. 1508433.8 dated Dec. 22, 2017 (2 pages).
International Search Report issued in PCT/GB2016/000100 dated Aug. 29, 2016 (2 pages).
Written Opinion of the International Searching Authority issued in PCT/GB2016/000100 dated Aug. 29, 2016 (7 pages).

* cited by examiner

MECHANICAL SEAL ASSEMBLY

The present invention relates to a mechanical seal assembly, in particular a mechanical seal assembly for providing a metal-to-metal seal within a flanged connection.

Flanges are widely used for connecting two pipes together, or when connecting a pipe to a valve, pump and other auxiliary device for controlling or monitoring flow within a flow line, for example.

A wholly conventional flange takes the form of a flange body having first and second ends and a fluid bore of circular cross section extending between the first and second ends. A first end of the fluid bore is exposed at the first end of the flange body, and the first end of the flange body is of larger diameter than the second end of the flange body, defining a flange connection face concentric with the fluid bore. A plurality of bolt holes are provided through the first end, off-set from the fluid bore and extending in a direction parallel with the central axis of the fluid bore.

When connecting two pipes together, a flanged joint can be made by bolting together two flanges, with a gasket clamped between them to provide a pressure seal. When connecting a pipe to a valve, pump and other auxiliary device (e.g. for controlling or monitoring flow within a flow line), the auxiliary device will typically a flanged connection face configured for bolted connection with the flange connection face of a conventional flange, with a gasket clamped between the flanged connection face of the auxiliary device and the flange connection face of the conventional flange.

Conventional flanges are approved for use under certain pressure and/or temperature conditions according to one or more widely recognised standards, such as the American National Standards Institute (ANSI). Depending on the material the flange is made from, such as cast iron or steel, and the type of connection required to attach the flange to a pipe (e.g. via a welded or threaded connection), standard class ratings are determined, such as to provide a pressure/temperature rating or required bolt and nut dimensions etc.

In the oil and gas industry, for example, flanges are expected to withstand high pressures and the ANSI standards provide consumers with important information on the characteristics and performance of the flange, as well as an assurance that they are receiving the right product for their particular application.

The ANSI B16.5 pipe flanges are rated from Class 150 through to Class 2500 which allow for hydrostatic test pressures ranging from 400 psi (2.76 MPa) up to just under 10,000 psi (68.95 MPa).

As the operating pressure of a pipeline incorporating a flanged joint increases, more force is required to compress the gasket and contain the force acting on the seal. This requirement drives the size and complexity of the bolt configuration, thus necessitating a larger flange to accommodate the bolting requirements at higher pressures.

For example, a Standard 2 inch Class 150 flange will have an outside diameter of 6 inches (152.40 mm) and a thickness of 0.75 inches (19.05 mm), while a Standard 2 inch Class 2500 flange will have an outside diameter of 9.25 inches (234.95 mm) and a thickness of 2 inches (50.80 mm). In addition, the bolt requirement doubles from 4 bolts to 8 bolts, the diameter of the required bolts increases from 0.625 inches (15.88 mm) to 1 inch (25.4 mm), and the applied torque increases from 80 Ft/lbs (108.47 Nm) to 300 Ft/lbs (406.75 Nm).

The large diameter and thickness of the Class 2500 flange is required simply to accommodate the 8 large bolts required to meet the recommended torque. Customers are therefore paying a huge amount of money for material consumed in the production of a flanged product in order to accommodate higher pressure uses. The opportunity for unnecessary waste and associated cost is multiplied considerably when dealing with more expensive grades of material, such as alloy 625, which is 10 times more expensive than regular stainless steel. In addition, there are further costs associated with the packaging, transportation and installation of goods that are larger and/or heavier than they need to be, as well as the obvious health and safety implications. There is therefore a need for improved flange solutions which reduces or eliminates the effect of one or more of the issues identified above.

According to a first aspect of the invention, there is provided a mechanical seal assembly, in accordance with claim 1.

In use, it will be understood that the metal-to-metal seal is created by bringing the two flanges together, such that each annular seal surface of said metallic seal element engages with the annular metallic seal surface of a respective one of said first and second flanges (e.g. with the respective central bores of the two flanges in concentric alignment with one another). Bolts are then used (via the bolt holes) to secure the first and second flanges together and bring about sealing engagement between the annular seal surfaces of the metallic seal element and the annular metallic seal surfaces of said first and second flanges.

The seal assembly in accordance with the invention provides a more robust sealing solution than known gasket arrangements for standard flanges of the kind set forth. It also drastically reduces the amount of bolting force required to maintain the seal than would otherwise be necessary for a gasket solution using the same standard flange geometry.

In general, the forces required to energise the metallic seal will be much lower than those required in gasket solutions, thereby reducing the need for complex bolting solutions for high pressure applications. As a result, small standard flanges (e.g. having a 'small' flange geometry typically associated with low pressure applications) can be converted to operate at high pressures (i.e. substantially above their standard rated value. Moreover, the use of the recess has been found to reduce bending stresses within the flange body under bolt torque, thereby making it more likely that small standard flanges can be bolted to operate at higher pressures than is conventionally accepted under known operating standards.

In exemplary embodiments, the first and/or second flange body is connected to or connectable to a pipe, e.g. by a weld or a screw thread.

In exemplary embodiments, the annular metallic seal surface of each flange body defines a transition between said recess and said fluid bore.

In exemplary embodiments, the bottom surface of each recess extends orthogonal to said central axis.

In exemplary embodiments, the flange connection face of each flange includes an upstand, concentric with said fluid bore, having a mating surface for abutment with the mating surface of another respective flange, i.e. when two such flanges are brought together.

In exemplary embodiments, the flange connection face of each flange includes an outer radial surface, outboard of said upstand, wherein the outer radial face is offset axially from said mating surface.

In exemplary embodiments, the bottom face of the recess in each flange is offset axially from the outer radial surface of said flange.

In exemplary embodiments, at least one of said flanges is a standard flange, of the kind set forth, e.g. having a flange body with first and second ends and a fluid bore of circular cross section extending between the first and second ends, wherein a first end of the fluid bore is exposed at the first end of the flange body, wherein the first end of the flange body is of larger diameter than the second end of the flange body and defines a flange connection face concentric with the fluid bore, and wherein a plurality of bolt holes are provided through the first end, off-set from the fluid bore and extending in a direction parallel with the central axis of the fluid bore; and further wherein the recess has been formed in the flange connection face of said standard flange (e.g. by removing material from the flange connection face).

In exemplary embodiments, the standard flange is of the kind wherein the flange connection includes an upstand, concentric with said fluid bore, having a mating surface for abutment with the mating surface of another respective flange (e.g. when two such flanges are brought together), and wherein the flange connection face includes an outer radial surface, which is outboard of said upstand and offset axially from said mating surface; and further wherein at least a part of the recess has been formed by removing stock from said upstand.

In exemplary embodiments, the standard flange has been modified such that the bottom face of the recess in said flange is offset axially from the outer radial surface of said flange.

In exemplary embodiments in which one or more standard flanges are used, having said recess machined therein, it will be understood that the metallic seal element will be designed such that the annular seal surface on each of the first and second faces of said metallic seal element is complimentary to the new annular metallic seal surface of the or each flange.

In exemplary embodiments, the metallic seal surface extends at an angle to said central axis of the fluid bore.

In exemplary embodiments, the metallic seal surface extends from a first diameter at said surface spaced axially from said flange connection face to a second diameter at a further depth within the flange body, wherein the first diameter is greater than the second diameter.

In exemplary embodiments, a shoulder is formed between the metallic seal surface and an internal wall of the fluid bore on each flange.

In exemplary embodiments, the shoulder is located at a depth from the flange connection face of each flange suitable to ensure that the seal element is spaced therefrom when the seal element is arranged in sealing engagement between the first and second flanges.

In exemplary embodiments, the seal element is configured so that the central bore thereof confirms at least substantially to the dimensions of the fluid bore of the first and second flanges.

In exemplary embodiments, each of the annular seal surfaces of the metallic seal element are part of a cone, lip, nose or other projection extending from a respective face of the metallic seal element.

In exemplary embodiments, the first and/or second flange is a weld neck flange, e.g. ANSI B16.5 Class 150 weld neck flange.

The invention also has application in the provision of a metal-to-metal seal between a single flange of (whether of standard configuration and then modified to include the recess and a new metallic seal surface, or specifically-produced as a bespoke item with the recess and metallic seal surface as an integral part thereof) and an auxiliary device having a flanged connection face configured for bolted connection with the single flange. In such applications, it will be understood that the flanged connection face of the auxiliary device will already include a seat surface for use in clamping a gasket between the flanged connection face of the auxiliary device and the flange connection face of the single flange. Accordingly, the seat surface of the auxiliary device can be modified to include a complimentary recess and metallic seal surface (or, indeed, the auxiliary device may be produced as a bespoke item, with the recess and metallic seal surface as an integral part thereof. The metallic seal element will therefore be designed so that the annular seal surface on one face thereof is complimentary to the new metallic seal surface of the single flange, and so that the annular seal surface on the other face thereof is complimentary to the metallic seal surface of the auxiliary device, for sealing engagement therewith. Metal-to-metal seals can then be created between by clamping the metallic seal element between the single flange and the auxiliary device, by arranging the metallic seal element so that each annular seal surface of said metallic seal element engages with a metallic seal surface on a respective one of said single flange and said auxiliary device, and then using bolts or the like to secure the assembly together and bring about sealing engagement between the annular seal surfaces of the metallic seal element and the metallic seal surfaces of said single flange and auxiliary device.

A standard flange of the kind set forth means a flange of known configuration in the art, comprising a flange body having first and second ends and a fluid bore of circular cross section extending between the first and second ends, wherein a first end of the fluid bore is exposed at the first end of the flange body, wherein the first end of the flange body is of larger diameter than the second end of the flange body and defines a flange connection face concentric with the fluid bore, and wherein a plurality of bolt holes are provided through the first end, off-set from the fluid bore and extending in a direction parallel with the central axis of the fluid bore.

Although the illustrated embodiments herein have been designed using ANSI B16.5 as the baseline geometry, the invention clearly applies to any range of flange family defined by an international standard using traditional raised face or RTJ compressed gaskets. Such families will include different sizes of flange grouped by pressure rating and having increasingly large and complex bolting configurations as the pressure range increases. The following are typical examples of international standards for flanges to which the invention will have applicability: ANSI B16.5, ANSI B16.47, BS3293, BS1560, EN1092, BS4504, DIN SERIES, NFE SERIES, API FLANGES, BS10, JIS, and ISO 7005.

As mentioned above, a single flange can be used to create a seal with an auxiliary device having a flanged connection face (i.e. configured for bolted connection and communication with the first end of the flange), by clamping a metallic seal element therebetween. A wide range of OEM auxiliary devices can be modified to take advantage of the enhanced performance, reduced weight and simplified bolting arrangements that the invention facilitates, particularly those made for flanged connection incorporating standard flange geometry derived from ANSI B16.5 (or any other international standard), integral or otherwise. Examples of OEM manufacturer currently active in producing such devices include Flexsteel pipe, Swagelok®, Parker Hannifin, Rosemount®, Emerson, Oliver Valves, President Engineering, Weir, Adanac, Cameron, Schlumberger, Shipham, Schnieder, Alco Hi Tech, Endress and Hauser. AES Seal, and Rotorke. Examples of the kind of auxiliary device to which the invention can be applied include valve products such as ball valves, gate valves, globe valves, diaphragm and pinch valves, plug and ball valves, butterfly valves, needle valves, as well as specifically designed products such as process interface and instrumentation valves, valve products such as mono flanges and block & bleed valves. Further specific examples of OEM product include Parker Pro Bloc®, Alco Sub Star needle valves, Swagelok® mono flanges or block & bleed valves. The invention will also have application in pressure, level and flow products (wireless or otherwise), such as Rosemount Tank Radar products and British Rototherm® products.

Further advantageous features or aspects of the invention are set out in the dependent claims, and/or will be apparent from the following description of embodiments, made by way of example with reference to the accompanying drawings, in which:

The preceding discussion of the background to the invention is intended only to facilitate an understanding of the invention. It should be appreciated that the discussion is not an acknowledgement or admission that any of the material referred to was part of the common general knowledge as at the priority date of the application.

Throughout the description and claims of this specification, the words "comprise" and "contain" and variations of the words, for example "comprising" and "comprises", mean "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics, and compounds described in conjunction with a particular aspect, embodiment or example of the invention are to be understood to be applicable to any other aspect, embodiment or example described herein unless incompatible therewith.

The figures are not necessarily to scale.

Figure 1:
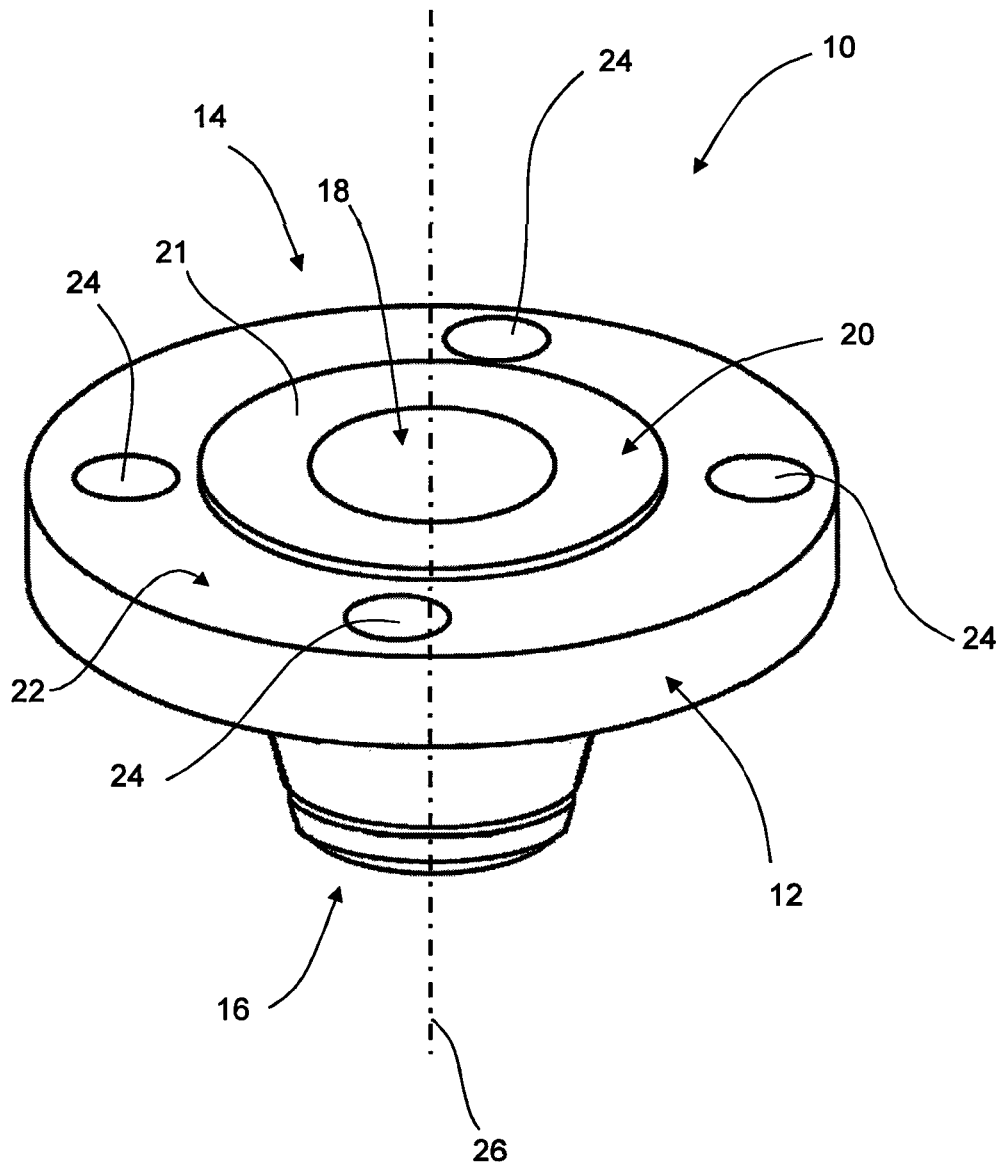
FIG. 1 is a perspective view of a conventional weld neck flange.

Referring now to FIG. 1, a flange of standard configuration in the art is shown at 10. Accordingly, the flange 10 takes the form of a flange body 12 having first and second ends 14, 16 and a fluid bore 18 of circular cross section extending between the first and second ends 14, 16. A first end of the fluid bore 18 is exposed at the first end 14 of the flange body 12. The first end 14 of the flange body 12 is of larger diameter than the second end 16, and defines a flange connection face 22 concentric with the fluid bore 18. A plurality of bolt holes 24 are provided through the first end of the flange body 12, off-set from the fluid bore 18 and extending in a direction parallel with a central axis 26 of the fluid bore 18.

The illustrated embodiment is based on standard ANSI B16.5 geometry, wherein the flange connection face 22 includes an upstand 20 at the first end of the body 12, having an upper surface 21 extending in a direction orthogonal to the central axis 26.

It will be understood that a conventional flanged joint can be made by bolting together two standard flanges 10, with a compressible gasket (not shown) clamped between the flange connection faces 22 of the two flanges 10 to provide a pressure seal, e.g. wherein the gasket has a body which is clamped between the opposing upstands 20. However, it has been found that the rated values for any given standard flange can be safely and significantly exceeded, if the flanges are modified in accordance with the following method, described with respect to FIGS. 2 to 5.

Figure 2:
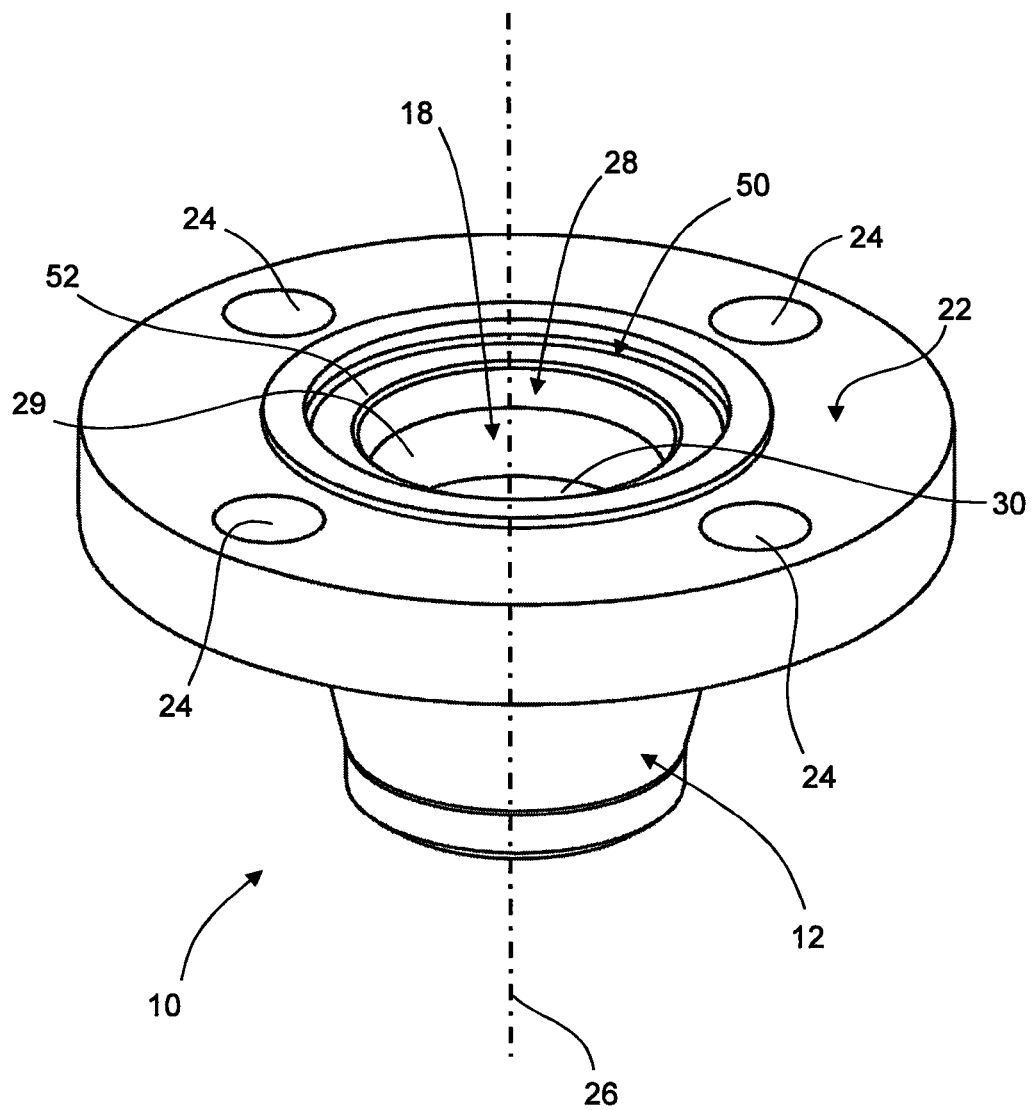
FIG. 2 is a perspective view of a modified weld neck flange.

Firstly, each flange 10 is modified to define a recess 50 adjacent the flange connection face 22, e.g. as shown in FIG. 2. The recess 50 includes a bottom surface 52 spaced axially from said flange connection face 22. Furthermore, each flange 10 is modified to include an annular metallic seal surface 28 extending inwardly from the bottom surface 52 in the direction of said fluid bore 18. The metallic seal surface 28 is concentric with the central axis 26.

Figure 3:
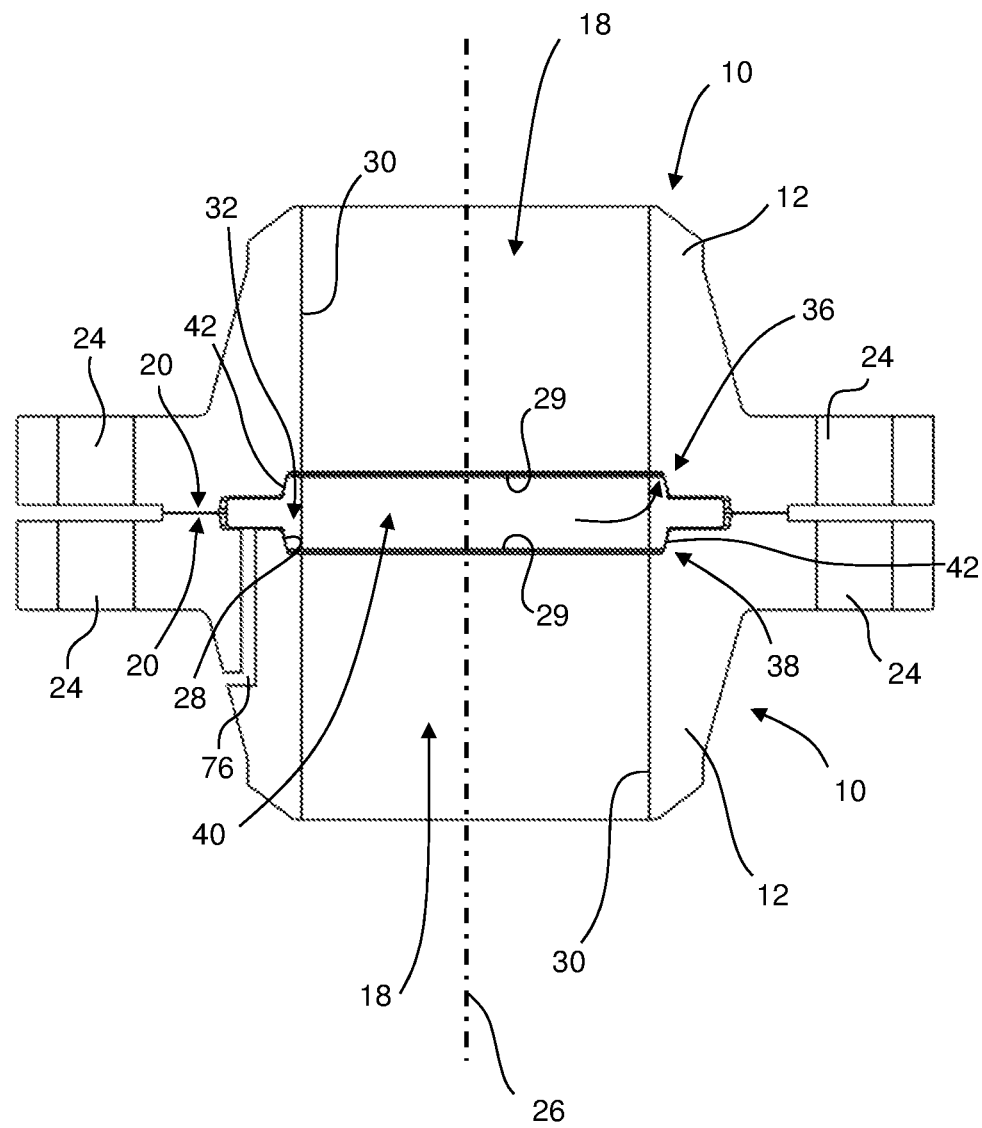
FIG. 3 is a cross-section through a weld neck flange sealing assembly, incorporating the modified weld neck flange of FIG. 2 and a metallic sealing element.

In the embodiment of FIGS. 2 and 3, at least a part of the recess 50 is formed by removing material from a part of the upstand 20 at the first end of the body 12. For example, the recess 50 can be achieved by machining into each upstand 20 or flange connection face 22, and the metallic seal surface 28 can be created by machining a chamfer or other angled transition between the bottom surface 52 and the fluid bore 18.

In alternative embodiments, the flange 10 can be a newly formed component (e.g. not necessarily a standard flange), integrally formed with the recess 50 and angled seal surface 28, or the flange 10 may be integrally formed with the recess 50 and the angled seal surface 28 can then be produced by a retro-machining operation.

In exemplary embodiments (such as is illustrated in FIG. 2), the metallic seal surface 28 extends at an angle to the central axis 26 of the flange body 12, and/or to the bottom surface 42 and/or the flange connection face 22.

In exemplary embodiments (such as is illustrated in FIG. 2), the metallic seal surface 28 extends at an angle to the central axis 26 of the fluid bore 18, from a first diameter at said bottom surface 42 to a second diameter at a depth within the flange body 12 (i.e. spaced from the bottom surface 40), wherein the first diameter is greater than the second diameter.

In exemplary embodiments (such as is illustrated in FIG. 2), a shoulder 29 is provided at a transition between the metallic seal surface 28 and an internal wall 30 of the fluid bore 18. The shoulder 29 is concentric with the central axis 26 of the body 12. In preferred embodiments, the shoulder 29 extends radially, e.g. parallel with the flange connection face 22.

A metallic seal element 32 can then be provided, as shown in FIG. 3. The metallic seal element 32 takes the form of a circular band having first and second faces 36, 38 and a central bore 40 therethrough. Each of the first and second faces 36, 38 includes an annular seal surface 42 concentric with the central bore 40. In preferred embodiments, each of the annular seal surfaces 42 of the metallic seal element 32 are part of a lip, nose or other projection extending from a respective face of the metallic seal element, and intended to be energised (e.g. by elastic deformation thereof) in order to bring about a satisfactory metal-to-metal seal with each of the flanges 10. In the illustrated embodiment, the metallic seal element can be said to define a cone projecting from each of said faces, wherein each annular seal surface 42 is defined by an outer surface of a respective cone.

The metallic seal element 32 is designed such that the annular seal surface 42 on each of the first and second faces 36, 38 is generally complimentary to the metallic seal surfaces 28 of a respective one of the two flanges 10. If the flanges 10 are identical, the metallic seal surfaces 28 may be of identical shape and configuration.

Metal-to-metal seals can then be created between the metallic seal element 32 and the two flanges 10, by locating the metallic seal element 32 between the two flanges 10, such that each annular seal surface 42 engages with the new metallic seal surface of a respective one of said two flanges 10, e.g. as shown in FIG. 3. Bolts (not shown) can then be used to secure the two flanges 10 together and bring about sealing engagement between the annular seal surfaces 42 and the metallic seal surfaces 28. The seal surface 42 is configured for energisation (e.g. by elastic deformation) under load (e.g. when the first and second flanges 10 are bolted together through bolt holes 24 aligned in the position shown in FIG. 3).

In the illustrated embodiment, the shoulder 29 is located at a depth from the flange connection face 22 suitable to ensure that the seal element 32 is spaced slightly therefrom when the seal surface 42 on the seal element 32 is in sealing engagement with a respective seal surface on the flange 10.

In the illustrated embodiment, the seal element 32 is configured so that the central bore 40 conforms at least substantially to the dimensions of the fluid bore 18 of the flanges 10, in order to provide fully flush bore operating conditions between the two flanges 10, in use, thereby reducing flow inefficiencies. This contrasts with conventional gasket arrangements, where the gasket bore typically has a much greater diameter than the fluid bore on each flange forming the sealed connection.

Moreover, in exemplary embodiments (such as illustrated herein), the seal element 32 defines an annular rib extending outboard of the annular seal surfaces 42, the annular rib having opposing radial surfaces. The seal element 32 and/or the flanges 10 are configured such that the opposing radial surfaces of the rib are spaced from the bottom surface 52 of a respective recess 50, when the metallic seal element 32 is clamped between the first and second flanges 10. This can be seen most clearly in FIGS. 4A and 4B. Moreover, the annular rib defines an outer side wall 54, and the recess 50 in each flange body 12 has a peripheral wall 56 configured to surround (but be spaced from, in exemplary embodiments) a portion of said outer side wall 54 when the seal element 32 is clamped between the first and second flanges 10, e.g. as shown in FIG. 3. In effect, the rib can be said to be floating within a compartment defined by the two recesses 50, when the two flanges 10 are brought together, since the seal element 32 does not bear against any part of the recesses 50.

In exemplary embodiments, one or both of the flanges 10 may include an internal passageway (76) having an inlet at a side surface of the flange body 12 and an outlet at the bottom surface 52 of the recess 50 for use in reverse integrity testing the sealing performance of the assembly. Accordingly, the seal element 32 may also include an aperture extending through the annular rib (e.g. between said opposing radial surfaces thereof).

As mentioned above, the flange body includes an upstand 20, the upper surface of which defines a mating surface 21, concentric with said fluid bore 18, outboard of said recess 50, and configured such that the mating surface 21 of the first flange 10 and the mating surface 21 of the second flange 10 engage in frictional contact with one another, when the seal element 32 has been securely clamped between the first and second flanges 10 (e.g. using bolts or the like via the bolt holes 24). As can be seen clearly in FIGS. 4A and 4B, the flange connection face 22 of each flange 10 includes an outer radial surface 58, outboard of said upstand 20. The outer radial face 58 is offset axially from said mating surface 21 (i.e. at a depth below the mating surface 21). Moreover, bottom surface 52 of the recess 50 in each flange 10 is offset axially from the outer radial face 58 of said flange (i.e. at a depth below the outer radial face 58). This can be seen most clearly in FIGS. 4A and 4B.

In exemplary embodiments, the mating surfaces 21 are configured to create a secondary test seal when the two flanges 10 are brought together for fluid communication with the seal element 32 securely clamped therebetween (e.g. using bolts or the like via the bolt holes 24).

Figure 4A:
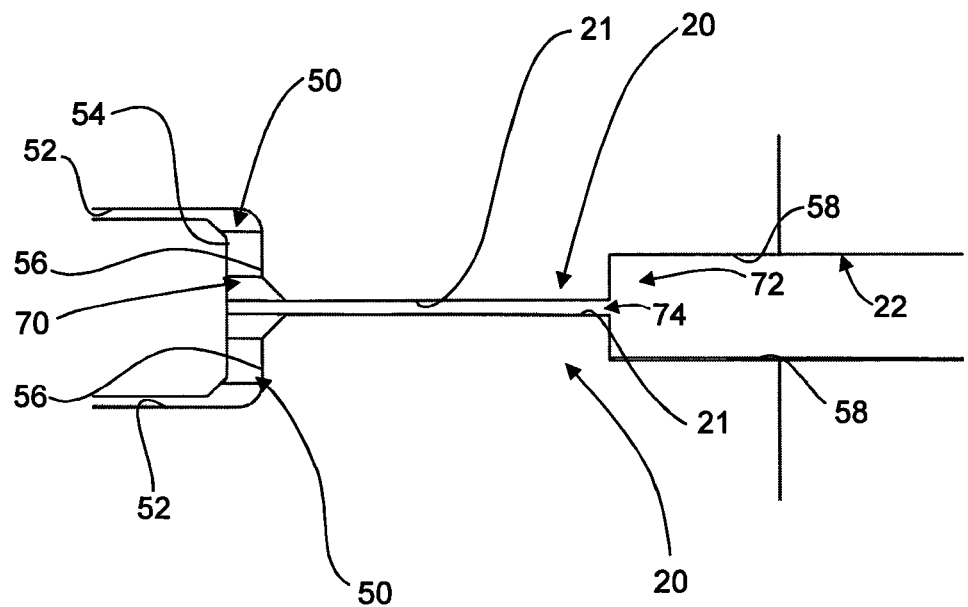
FIG. 4A is an enlarged view of part of the assembly of FIG. 3 in a first state, prior to bolting.
Figure 4B:
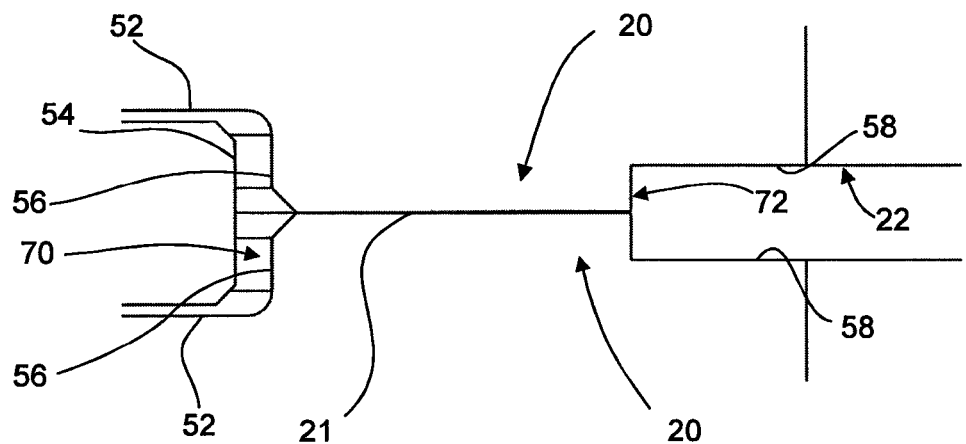
FIG. 4B is an enlarged view of part of the assembly of FIG. 3 in a second state, after bolting.

FIGS. 4A and 4B show an exemplary embodiment in which each mating surface 21 defines a taper or slope on the flange connection face, wherein the height of the upstand decreases from a radially inner edge 70 to a radially outer edge 72. The effect is that the mating surfaces define a substantially V-shaped recess 74 (albeit open at both ends, in the particular embodiment illustrated in FIG. 4A). As bolts or the like are used to secure the two flanges 10 together, via bolt holes 24, any clearance between the opposing mating surfaces 21 at the radially inner edges 70 is taken up, and the radially outer edges 74 are pulled in the direction of one another, in order to substantially take up any clearance, and thereby ensure a suitable seal between the opposing mating surfaces 21, e.g. as shown in FIG. 4B.

In exemplary embodiments, the first and/or second flange body 12 is connected to or connectable to a pipe, e.g. by a weld or a screw thread.

Figure 5:
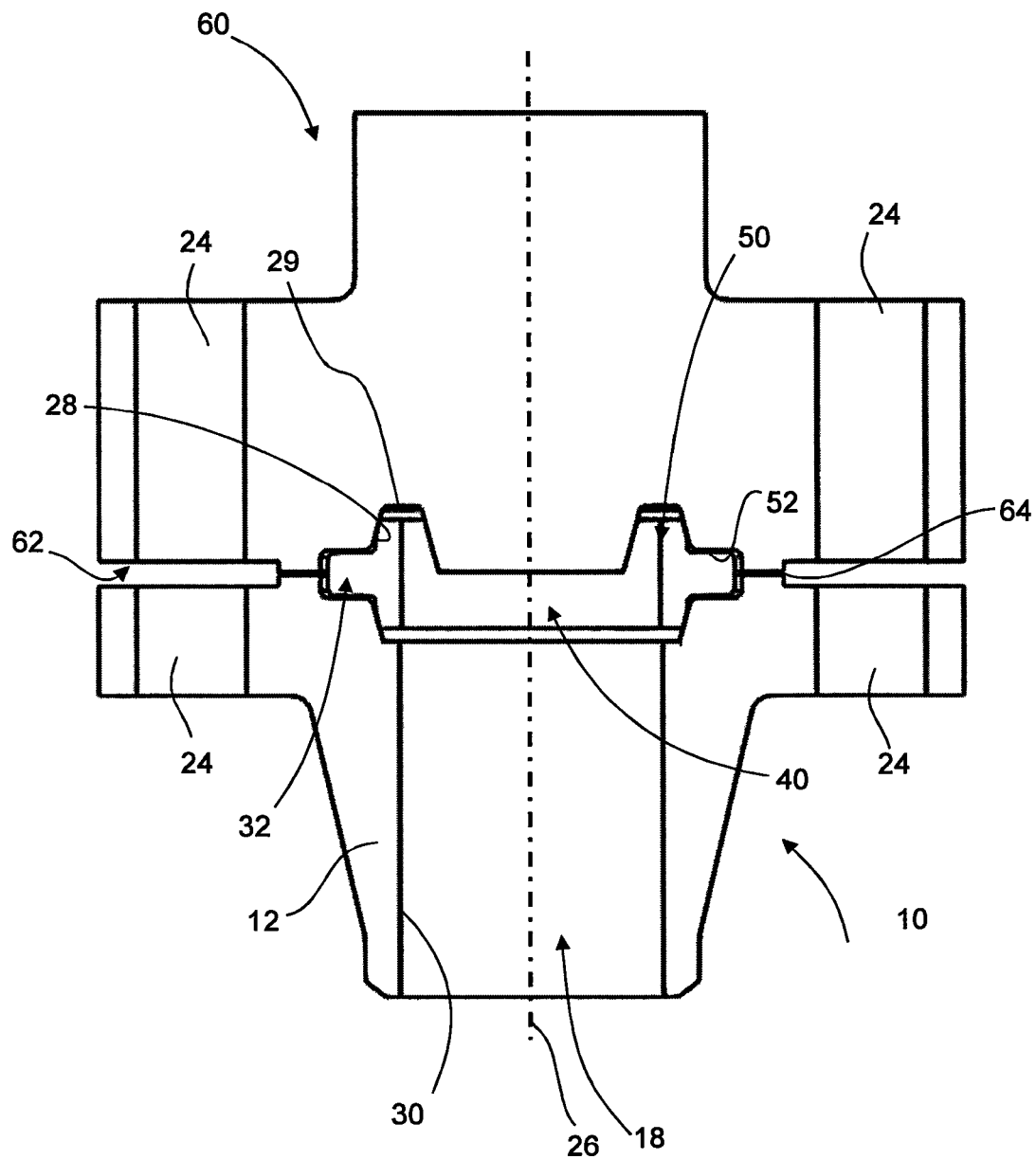
FIG. 5 is similar to FIG. 3, showing a cross-section through a variant weld neck flange sealing assembly, incorporating the modified weld neck flange of FIG. 2 and an auxiliary device.

It will be understood that the flanges 10 in FIGS. 1 to 3 are of the kind known as weld neck flanges. However, the invention has application for other types of flange or device having a flanged connection face. An example of such a device is illustrated in FIG. 5, wherein the device 60 has a flanged connection face 62 or seat configured for bolted connection with a flange of standard configuration. In such applications, it will be understood that the flanged connection face 62 of the auxiliary device 60 will already include a seat surface 64 for use in clamping a conventional gasket between the flanged connection face 62 of the auxiliary device 60 and the flange connection face 22 of the flange. Accordingly, the invention can be modified, so that a recess 50 and metallic seal surface 28 (e.g. of the kind shown in FIG. 2) is provided in the flange connection face 22 of the flange 10 (e.g. in the manner already set forth), as well as in the flanged connection face 62 of the auxiliary device 60. The metallic seal element 32 will therefore be designed so that the annular seal surface 42 on one face thereof is complimentary to the new metallic seal surface 28 of the flange 10, and further so that the annular seal surface 42 on the other face thereof is complimentary to the metallic seal surface 28 of the auxiliary device 60. Metal-to-metal seals can then be created between said metallic seal element 32 and each of said flange 10 and auxiliary device 60, by arranging the metallic seal element 32 so that each annular seal surface 42 of said metallic seal element 32 engages with a metallic seal surface 28 of a respective one of said flange 10 and auxiliary device 60, and then by using bolts or the like, via the bolt holes 24, to secure them together and bring about sealing engagement.

Again, a shoulder 29 may be provided on the auxiliary device 60, located at a depth from the connection face 64 suitable to ensure that the seal element 32 is spaced therefrom when the seal surface 42 on the seal element 32 is in sealing engagement with the seal surface 28 on the device 60. It will be understood that the seal element 32, and/or the flange 10 and/or the auxiliary device 60 may be configured to ensure a clearance between the rib of the seal element 32 and a compartment defined by cooperation between the recesses on the flange and auxiliary device.

Figure 6:
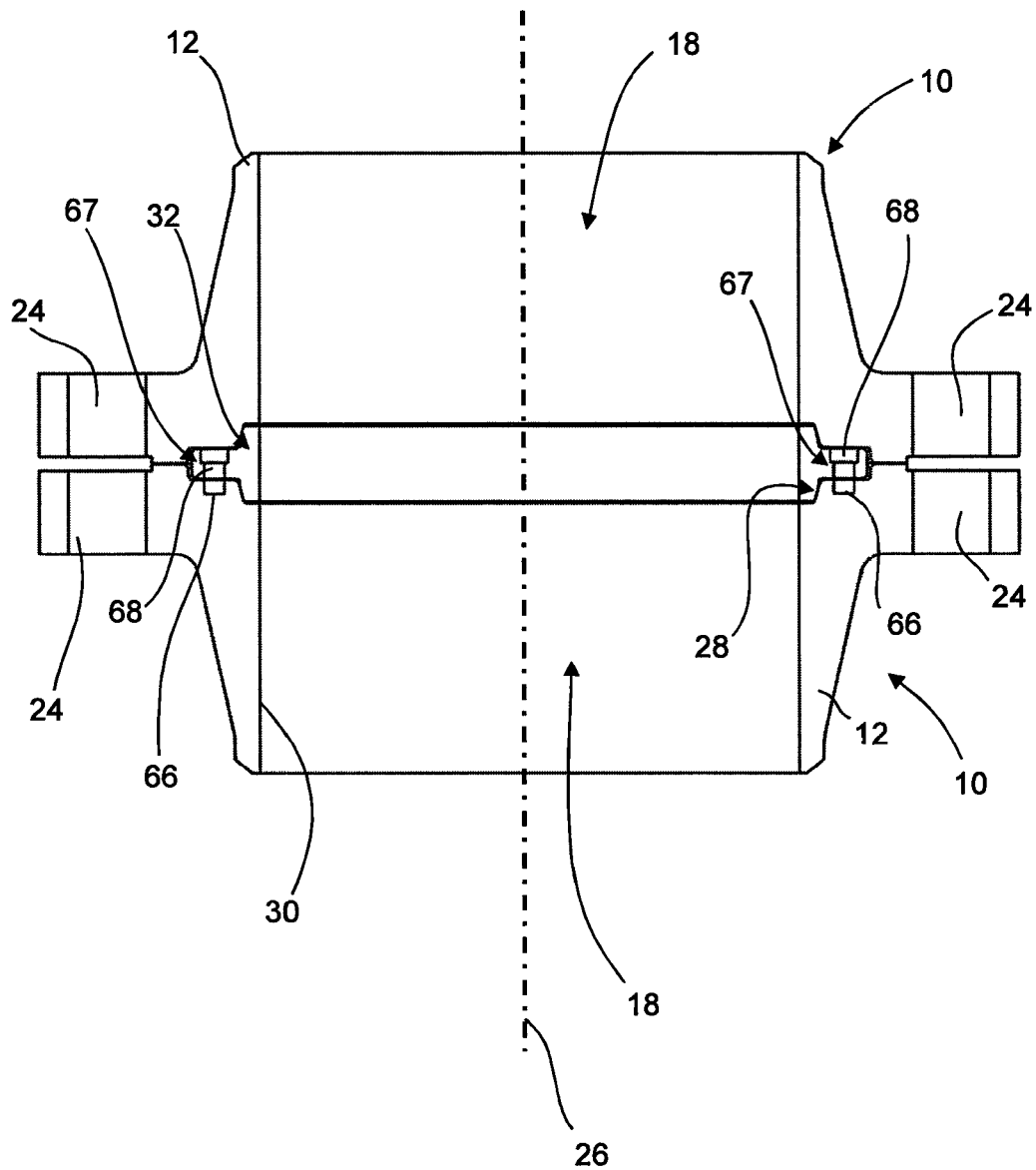
FIG. 6 is similar to FIG. 3, incorporating a variant of the modified weld neck flange of FIG. 2, having fixing points formed in the sealing element and the recess in the flange.

FIG. 6 shows an adaptation that may be applied to one or more of the embodiments described and illustrated herein. In particular, the bottom surface 52 of the recess 50 on at least one of the flanges 10 may be provided with a plurality of apertures 66 configured for receiving a fastener 68, such as a screw or the like, for use in locating the seal element 32 in correct alignment with the central axis 26 of the fluid bore 18. Accordingly, similar apertures 67 are required through the seal element (e.g. at locations outboard of the seal surface 42). The seal element 32 is not necessarily clamped against the seal surface 28 of the flange by the fastener, and instead may be allowed a degree of axial travel with respect to the flange, at least until such time as it becomes clamped in place by the opposing flange 10 (or auxiliary device 60, in embodiments of the kind described with reference to FIG. 5). As mentioned, this kind of arrangement allows for correct centring of the seal element 32, and can be used to avoid disturbance of the seal element (e.g. by clash with the opposing flange body or auxiliary device) during installation. This has particular advantage when dealing with heavy and/or large diameter flanges, also reducing handling and safety issues). This is possible by virtue of the fact that the annular rib of the seal element is not in active use during sealing, whereas other types of sealing arrangement (e.g. such as gaskets) require compression of the rib or its structural equivalent.

In exemplary embodiments, the metallic seal element is made from carbon steel, stainless steel or nickel alloy material. In exemplary embodiments, the material should have mechanical properties suitable to provide a suitable yield strength for the pressures intended, as well as providing suitable corrosion resistance (since the seal element will be in contact with a working fluid, in use).

In exemplary embodiments, the flange is made from carbon steel, stainless steel or nickel alloy material.

Although the illustrated flange embodiments have been designed using ANSI B16.5 as the baseline geometry, the invention clearly applies to any range of flange family defined by an international standard using traditional raised face or RTJ compressed gaskets. Such families will include different sizes of flange grouped by pressure rating and having increasingly large and complex bolting configurations as the pressure range increases. The following are typical examples of international standards for flanges to which the invention will have applicability: ANSI B16.5, ANSI B16.47, BS3293, BS1560, EN1092, BS4504, DIN SERIES, NFE SERIES, API FLANGES, BS10, JIS, and ISO 7005.

The invention claimed is:

1. A mechanical seal assembly comprising:
   a first flange and a second flange, each flange comprising
      a flange body having first and second ends and a fluid bore of circular cross section extending between the first and second ends,
      wherein a first end of the fluid bore is exposed at the first end of each flange body,
      wherein the first end of each flange body is of larger diameter than the second end of each flange body and defines a flange connection face concentric with the fluid bore,
      wherein a plurality of bolt holes are provided through the first end, off-set from the fluid bore and extending in a direction parallel with a central axis of the fluid bore,
      wherein each flange body includes a shoulder orthogonal to said central axis and an annular metallic seal surface,
      wherein each shoulder orthogonal to said central axis extends between an internal wall of said fluid bore and said annular metallic seal surface,
      wherein each metallic seal surface extends at an angle to said central axis of the fluid bore,
      wherein each flange body defines a recess adjacent the flange connection face,
      wherein each recess includes a surface spaced axially from said flange connection face,
      wherein each metallic seal surface extends from a first diameter at said shoulder orthogonal to said central axis, to a second diameter at said surface spaced axially from said flange connection face, wherein the second diameter is greater than the first diameter, and
      wherein each shoulder orthogonal to said central axis is at a first depth within the flange body with respect to said flange connection face, wherein each surface spaced axially from said flange connection face is at a second depth within the flange body with respect to said flange connection face, and wherein the first depth is greater than the second depth,
   the mechanical seal assembly further comprising a metallic seal element locatable between said first and second flanges, said metallic seal element comprising a circular band having first and second faces and a central bore,
      wherein each of the first and second faces of said metallic seal element includes an annular seal surface concentric with said central bore, and
      wherein the seal element is configured to be clamped between the two flange bodies, to create a metal-to-metal seal between the respective annular seal surface of the seal element and the annular metallic seal surface of a respective flange body, and
      wherein each shoulder orthogonal to said central axis is located at a depth from the flange connection face of each respective flange suitable to ensure that the seal element is spaced from said shoulder orthogonal to said central axis when the seal element is arranged in sealing engagement between the first and second flanges.

2. The mechanical seal assembly according to claim 1, wherein said metallic seal element defines an annular rib extending outboard of said annular seal surfaces, the annular rib having opposing radial surfaces, and
wherein said opposing radial surfaces are spaced from the surface spaced axially from the flange connection face of a respective recess, when the metallic seal element is clamped between the first and second flanges.

3. The mechanical seal assembly according to claim 2, wherein said annular rib includes an outer side wall, and
wherein the recess in each flange body comprises a peripheral wall configured to surround a portion of said outer side wall when the seal element is clamped between the first and second flanges.

4. The mechanical seal assembly according to claim 2, wherein the rib of the metallic seal element is enclosed in a compartment defined by the recesses on the first and second flanges, when the seal element is clamped between said first and second flanges.

5. The mechanical seal assembly according to claim 4, wherein one or both of said first and second flanges comprises a passageway having an inlet at a side of the flange body and an outlet at the surface spaced axially from the flange connection face of the recess.

6. The mechanical seal assembly according to claim 5, wherein the seal element comprises an aperture extending through the annular rib between said opposing radial surfaces.

7. The mechanical seal assembly according to claim 1, wherein the surface spaced axially from the flange connection face of the recess on at least one of the flanges is provided with a plurality of apertures configured for receiving a fastener for use in locating the seal element in correct alignment with the central axis of the fluid bore, and
wherein a second plurality of apertures are also provided through the seal element at locations outboard of the seal surfaces thereof.

8. The mechanical seal assembly according to claim 7 further configured to allow the seal element a degree of axial travel along the fastener with respect to the respective flange, once the fastener is in place and prior to clamping between the opposing flanges.

9. The mechanical seal assembly according to claim 1, wherein each flange body connection face comprises a mating surface, concentric with said fluid bore and outboard of said recess, configured such that the mating surface of the first flange and the mating surface of the second flange engage in frictional contact with one another, when the seal element is clamped between the first and second flanges.

10. The mechanical seal assembly according to claim 1, wherein the flange connection face of each flange defines an upstand, concentric with said fluid bore, having a mating surface for abutment with the mating surface of another respective flange.

11. The mechanical seal assembly according to claim 10, wherein the flange connection face of each flange includes an outer radial surface, outboard of said upstand, and wherein said outer radial surface is offset axially from said mating surface.

12. The mechanical seal assembly according to claim 10, wherein the mating surfaces are configured to create a seal when the two flanges are brought together for fluid communication.

13. The mechanical seal assembly according to claim 12, wherein the mating surface of each flange defines a slope extending from a radially inner position to a radially outer position.

14. The mechanical seal assembly according to claim 13, wherein the mating surfaces define a substantially V-shaped recess when the two flanges are brought together without bolt torque applied.

15. The mechanical seal assembly according to claim 1, wherein the seal element is configured so that the central bore thereof conforms at least substantially to the dimensions of the fluid bore of the first and second flanges.

16. The mechanical seal assembly according to claim 1, wherein each of said flanges comprises a flange body with first and second ends and a fluid bore of circular cross section extending between the first and second ends,
wherein a first end of the fluid bore is exposed at the first end of the flange body,
wherein the first end of the flange body is of larger diameter than the second end of the flange body and defines a flange connection face concentric with the fluid bore,
wherein a plurality of bolt holes are provided through the first end, off-set from the fluid bore and extending in a direction parallel with the central axis of the fluid bore, and
wherein the recess has been formed in the flange connection face of said standard flange.

17. The mechanical seal assembly according to claim 16, wherein each flange connection face includes an upstand, concentric with said fluid bore, having an upper mating surface for abutment with the upper mating surface of another respective flange,
wherein each flange connection face includes an outer radial surface, which is outboard of said upstand and offset axially from said mating surface; and further wherein at least a portion of the recess has been formed by removing stock from said upstand.

18. A mechanical seal assembly comprising a first flange, an auxiliary device configured for connection to said first flange, and a metallic seal element configured for clamping between the first flange and the auxiliary device, in order to create a metal-to-metal seal therebetween;
wherein the first flange comprises a flange body having first and second ends and a fluid bore of circular cross section extending between the first and second ends,
wherein a first end of the fluid bore is exposed at the first end of the flange body, the first end of the flange body is of larger diameter than the second end of the flange body and defines a flange connection face concentric with the fluid bore, and a plurality of bolt holes are provided through the first end, off-set from the fluid bore and extending in a direction parallel with the central axis of the fluid bore,
wherein the flange body includes a shoulder orthogonal to said central axis and an annular metallic seal surface,
wherein the shoulder orthogonal to said central axis extends between an internal wall of said fluid bore and said annular metallic seal surface,
wherein the metallic seal surface extends at an angle to said central axis of the fluid bore,
wherein the flange body defines a recess adjacent the flange connection face,
wherein the recess includes a surface spaced axially from said flange connection face,
wherein the metallic seal surface extends from a first diameter at said shoulder orthogonal to said central axis, to a second diameter at said surface spaced axially from said flange connection face, wherein the second diameter is greater than the first diameter, and
wherein the shoulder orthogonal to said central axis is at a first depth within the flange body with respect to said flange connection face, wherein the surface spaced axially from said flange connection face is at a second depth within the flange body with respect to said flange connection face, and wherein the first depth is greater than the second depth,
wherein the auxiliary device includes a flanged portion having a seat surface at one end thereof for communication with said first flange, wherein the flanged portion has a plurality of bolt holes arranged for complimentary alignment with the bolt holes of said first flange, wherein the flanged portion defines a recess adjacent the seat surface of the auxiliary device, wherein the recess in the flanged portion includes a surface spaced axially from said seat surface, wherein the flanged portion includes an annular metallic seal surface formed in said surface spaced axially from the flange connection face and intended to be concentric with the central axis of the flange when said flange is arranged in communication with the flanged portion, the metallic seal surface extending at an angle from a first diameter at said surface spaced axially from the flange connection face to a second diameter at a depth within the flanged portion, wherein the first diameter is greater than the second diameter, wherein the metallic seal element comprises a circular band having first and second faces and a central bore, wherein each of the first and second faces of said metallic seal element includes an annular seal surface concentric with said central bore, wherein the annular seal surface on the first face of said metallic seal element is complimentary to the metallic seal surface of the flange, for sealing engagement therewith, wherein the annular seal surface on the second face of said metallic seal element is complimentary to the metallic seal surface of the auxiliary device, for sealing engagement therewith, wherein the metallic seal element is located such that each annular seal surface of said metallic seal element can be engaged with the metallic seal surface of a respective one of said first flange and said auxiliary device, and bolts can be used to secure the first flange and auxiliary device together, via said bolt holes, appropriately aligned, thereby providing sealing engagement between the annular seal surfaces of the metallic seal element and the metallic seal surfaces of said first flange and said auxiliary device; and wherein the shoulder orthogonal to said central axis is located at a depth from the flange connection face suitable to ensure that the seal element is spaced from the shoulder orthogonal to said central axis when the seal element is arranged in sealing engagement between said first flange and said auxiliary device.

19. A flange for use in a mechanical seal assembly, the flange comprising:

a flange body having first and second ends; and a fluid bore of circular cross section extending between the first and second ends, wherein a first end of the fluid bore is exposed at the first end of the flange body, the first end of the flange body is of larger diameter than the second end of the flange body and defines a flange connection face concentric with the fluid bore, and a plurality of bolt holes are provided through the first end, off-set from the fluid bore and extending in a direction parallel with the central axis of the fluid bore, wherein the flange body includes a shoulder orthogonal to said central axis and an annular metallic seal surface, wherein the shoulder orthogonal to said central axis extends between an internal wall of said fluid bore and said annular metallic seal surface, wherein the metallic seal surface extends at an angle to said central axis of the fluid bore, wherein the flange body defines a recess adjacent the flange connection face, wherein the recess includes a surface spaced axially from said flange connection face, wherein the metallic seal surface extends from a first diameter at said shoulder orthogonal to said central axis, to a second diameter at said surface spaced axially from said flange connection face, wherein the second diameter is greater than the first diameter, and wherein the shoulder orthogonal to said central axis is at a first depth within the flange body with respect to said flange connection face, wherein the surface spaced axially from said flange connection face is at a second depth within the flange body with respect to said flange connection face, and wherein the first depth is greater than the second depth, wherein the shoulder orthogonal to said central axis is located at a predetermined depth from the flange connection face.

* * * * *